US012746851B2

(12) United States Patent
Quix et al.

(10) Patent No.: US 12,746,851 B2
(45) Date of Patent: Sep. 29, 2026

(54) COOLING CIRCUIT FOR VEHICLES OPERATED BY MEANS OF FUEL CELLS

(71) Applicant: FORD GLOBAL TECHNOLOGIES, LLC, Dearborn, MI (US)

(72) Inventors: Hans Guenter Quix, Herzogenrath (DE); Jan Mehring, Cologne (DE); Stefan Quiring, Duesseldorf (DE); Tobias Emig, Gelsenkirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 143 days.

(21) Appl. No.: 18/658,220

(22) Filed: May 8, 2024

(65) Prior Publication Data

US 2024/0375548 A1 Nov. 14, 2024

(30) Foreign Application Priority Data

May 9, 2023 (DE) ......................... 102023112033.6

(51) Int. Cl.

*B60L 58/40* (2019.01)
*B60L 58/26* (2019.01)
*B60L 58/33* (2019.01)

(52) U.S. Cl.

CPC ............... *B60L 58/40* (2019.02); *B60L 58/26* (2019.02); *B60L 58/33* (2019.02); *B60L 2240/525* (2013.01); *B60L 2240/545* (2013.01)

(58) Field of Classification Search

CPC .......... B60L 58/26; B60L 58/33; B60L 58/40; B60L 2240/545; B60L 1/02; B60H 1/00385; B60H 1/00357; B60H 1/143

See application file for complete search history.

(56) References Cited

U.S. PATENT DOCUMENTS

2007/0157647 A1* 7/2007 Duhme ................... B60L 58/26 62/185
2015/0258875 A1* 9/2015 Enomoto ............... B60K 11/02 165/104.31

(Continued)

FOREIGN PATENT DOCUMENTS

DE 102011076737 A1 12/2012
DE 102021213893 A1 8/2022
EP 3444135 B1 5/2020

OTHER PUBLICATIONS

German Search Report for Application No. 102023112033.6 mailed Mar. 26, 2025, 7 pages.

*Primary Examiner* — Frantz F Jules
*Assistant Examiner* — Martha Tadesse
(74) *Attorney, Agent, or Firm* — David B. Kelley; Brooks Kushman P.C.

(57) ABSTRACT

A cooling system for a fuel cell electric vehicle includes a first circuit designed as a compact cooler unit with an indirect evaporator and indirect condenser. A low-temperature second circuit includes a first partial circuit cooling fuel cell electronic control components, a second partial circuit cooling the electric drive system electronic components, and a third partial circuit through the indirect condenser. A third circuit cools the traction battery. A fourth circuit (high-temperature) flows around the fuel cells. A control device controls operation of liquid coolant pumps in the circuits and of controllable valves for controlling the liquid flow in the secondary circuit. The second and third circuits are connected to one another via a first controllable valve, which is arranged as the only control valve in the second circuit.

19 Claims, 4 Drawing Sheets

(56) References Cited

U.S. PATENT DOCUMENTS

| | | | | |
|---|---|---|---|---|
| 2016/0107505 | A1 | 4/2016 | Johnston | |
| 2021/0301691 | A1* | 9/2021 | Hasegawa ............ | B60H 1/2218 |

* cited by examiner

COOLING CIRCUIT FOR VEHICLES OPERATED BY MEANS OF FUEL CELLS

CROSS-REFERENCE TO RELATED APPLICATIONS

This application claims foreign priority benefits under 35 U.S.C. § 119 (a)-(d) to DE Application 10 2023 112 033.6 filed May 9, 2023, which is hereby incorporated by reference in its entirety.

TECHNICAL FIELD

The disclosure relates to a cooling system for a vehicle having fuel cells, to a corresponding vehicle and to a method for operating the cooling system.

BACKGROUND

Electrically driven vehicles which draw energy from fuel cells are also referred to as FCEV (fuel cell electric vehicles). The electrical energy is either used directly by an electric drive or is temporarily stored in a drive battery. FCEVs have a series of electronic components which are provided for control of the electric drive system and for control of the fuel cells. In conventional practice, these components are cooled by a coolant circuit.

To cool fuel cells and other component parts involved in driving an electric vehicle, an efficient cooling system is required. Conventional cooling systems of the kind that are already known from battery-operated vehicles use what are referred to as compact cooling units. It would be desirable to use such cooling systems to cool fuel cells. However, the topology of coolant circuits for cooling fuel cells and the corresponding component parts is very complex, with different requirements for heating and cooling, and therefore conventional cooling systems cannot simply be transferred.

SUMMARY

Embodiments according to this disclosure provide a cooling system having a compact cooling unit for fuel cell-operated vehicles. The embodiments of the disclosure can be combined in an advantageous way.

A first aspect relates to a cooling system for an electrically driven vehicle having fuel cells, which comprises: at least one first circuit, which is designed as a compact cooler unit and has at least one indirect evaporator, and at least one indirect condenser; at least one second circuit, which is designed as a low-temperature circuit and has at least one first partial circuit for cooling the electronic components provided for control of the fuel cells, at least one second partial circuit for cooling the electronic components of the electric drive system, and at least one third partial circuit through the indirect condenser; at least one third circuit, which is arranged for cooling at least one battery; at least one fourth circuit, which flows around the fuel cells and is designed as a high-temperature circuit; and a control device, wherein a number of pumps for driving a liquid flow in the circuits, and a number of controllable valves for controlling the liquid flow in the second circuit and the third circuit, are arranged in the cooling system, and wherein the second circuit and the third circuit are connected to one another via a first controllable valve, which is arranged as the only valve in the second circuit.

Embodiments according to the disclosure allow advantageous synergistic effects between uses of battery-operated electric vehicles and electric vehicles operated by means of fuel cells in respect of the cooling of component parts and of corresponding coolant systems. According to various embodiments, cooling systems that have been developed for battery-operated vehicles can be adapted in an advantageous way for cooling fuel cells and corresponding additional component parts. As a result, development resources are conserved, as are the time and materials for the manufacture of complex cooling systems that have been developed specifically for cooling fuel cells.

Moreover, one or more embodiments advantageously allow application-specific cooling of various branches of the cooling system, depending on where and how much cooling is required for specific component parts. It is thereby possible to efficiently control the energy for cooling. In addition, control of the cooling in the low-temperature circuit works with just one control valve. As a result, the cooling system is also less complex than conventional systems and also economical in terms of construction. Not least, the battery can also be cooled without having to activate the coolant system. By this means too, energy is advantageously saved. In particular, the battery is a traction battery. If not stated otherwise, the terms “traction battery” and “battery” are used synonymously here. Furthermore, the terms “control valve” and “controllable valve” are used synonymously.

In one embodiment, a first pump is arranged in the first partial circuit, the pump being provided to drive the flow in the second circuit. In particular, the pump is the only pump in the second circuit. This saves material and energy resources. The pump is also used at least in part to drive the flow in the third circuit.

The first controllable valve may be a central proportional control valve. This embodiment advantageously enables control of the coolant flow in the circuits or partial circuits, i.e. in the first, second and third partial circuits of the second circuit and in the third circuit, allowing savings to be made with respect to the coolant flow rate and energy.

The first controllable valve may have one inlet and four outlets. This design allows efficient control of the coolant flow through the three partial circuits of the second circuit and the third circuit, depending on the respective cooling requirement of the component parts around which the coolant flows or upon which the coolant impinges in the circuits. In this case, a first outlet is connected to the first partial circuit, a second outlet is connected to the second partial circuit, a third outlet is connected to the third partial circuit, and a fourth outlet is connected to the third circuit. On the first control valve it is possible to set six advantageous switching modes, which result in corresponding state modes of the cooling system. In this case, the first outlet is always open, wherein the flow through the first partial circuit can be controlled by switching the first pump on and off. This design is advantageous because it is not necessary to control an outlet of the first control valve, and the first control valve is of less complex construction. In a possible alternative embodiment, the first control valve can be provided with one inlet and three outlets, wherein the connection from the first pump to the first partial circuit is direct, bypassing the first control valve.

In the system, no coolant flow is provided in the second and third circuits in a first switching mode of the first control valve. In this case, the inlet and the second, third and fourth outlets of the first control valve are closed. In this case, the first pump is switched off. As a result, no coolant flow is provided when it is not necessary, and energy is advantageously saved.

In the system, a coolant flow through the first partial circuit of the second circuit can be controlled in a second switching mode of the first control valve. The first pump is switched on. As a result, coolant can flow through the (continuously open) first outlet, while the other outlets are closed. In the second and third partial circuits and the third circuit, no coolant flow is controlled. Cooling of the electronic components provided for control of the fuel cells is thereby advantageously made available when the temperature of the components requires cooling that can be provided using a low-temperature radiator, and other component parts of the cooling system do not need to be cooled.

In the system, a coolant flow through the first partial circuit and the third partial circuit of the second circuit can be controlled in a third switching mode of the first control valve. The first and third outlets in the first control valve are then open, and the other outlets are closed. The first pump is switched on. In the second partial circuit and in the third circuit, no coolant flow is controlled. Cooling of the electronic components provided for control of the fuel cells is thereby advantageously made available when the temperature of the components requires cooling but that of other component parts of the cooling system does not, and there is a flow of coolant to the indirect condenser, in order to use the cooling of the cooling unit.

In the system, a coolant flow through the first, second and third partial circuits of the second circuit can be controlled in a fourth switching mode of the first control valve. The first, second and third outlets in the first control valve are then open, and the fourth outlet is closed. The first pump is switched on. In the third circuit, no coolant flow can be controlled. Cooling of the electronic components provided for control of the fuel cells and of the electronic components of the electric drive system is thereby advantageously made available when the temperature of the components requires cooling but that of the battery does not, and there is a flow of coolant to the indirect condenser, in order to use the cooling of the cooling unit. The fourth switching mode corresponds to the standard mode of the cooling system.

In the system, a coolant flow through the first, second, and third partial circuits of the second circuit and through the third circuit can preferably be controlled in a fifth switching mode of the first control valve. The first, second, third and fourth outlets in the first control valve are then open. The first pump is switched on. Cooling of the electronic components provided for control of the fuel cells, of the electronic components of the electric drive system, and of the battery is thereby advantageously made available when the temperature of the components requires cooling, and there is a flow of coolant to the indirect condenser, in order to use the cooling of the cooling unit.

In the system, a coolant flow through the first partial circuit of the second circuit and through the third circuit can be controlled in a sixth switching mode of the first control valve. The second and fourth outlets in the first control valve are then open. The first pump is switched on. Cooling of the electronic components provided for control of the fuel cells via the low-temperature radiator and of the battery via the internal heat exchanger is thereby advantageously made available.

The cooling unit of the system may have one indirect condenser and two indirect evaporators. Indirect evaporators allow control of the coolant flows and coolant temperatures that are fed to the interior cooler and to the battery, respectively. An arrangement with two indirect evaporators is advantageously suitable for separate control of the temperatures of the interior cooler and the battery, which may be very different, depending on the cycle.

A second aspect relates to a motor vehicle having a cooling system according to the disclosure.

A third aspect of the disclosure relates to a method for controlling the cooling system according to the disclosure, wherein the control device of the cooling system is designed to control and implement the method, comprising the following steps: determining the temperatures in devices of the vehicle including electronic components provided for control of the fuel cells, electronic components of the electric drive system, and a battery; determining the requirements for cooling the devices of the vehicle by means of the control device, wherein a coolant flow becomes necessary if at least one first threshold value is exceeded; transmitting a control command from the control device to the first control valve; and switching the first control valve, such that a coolant flow to the devices in the first, second and third partial circuits of the second circuit and in the third circuit is controlled according to requirements, wherein the flow in the first and fourth circuits is controlled independently of the first controllable valve.

The advantages of the method correspond to the advantages of the cooling system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
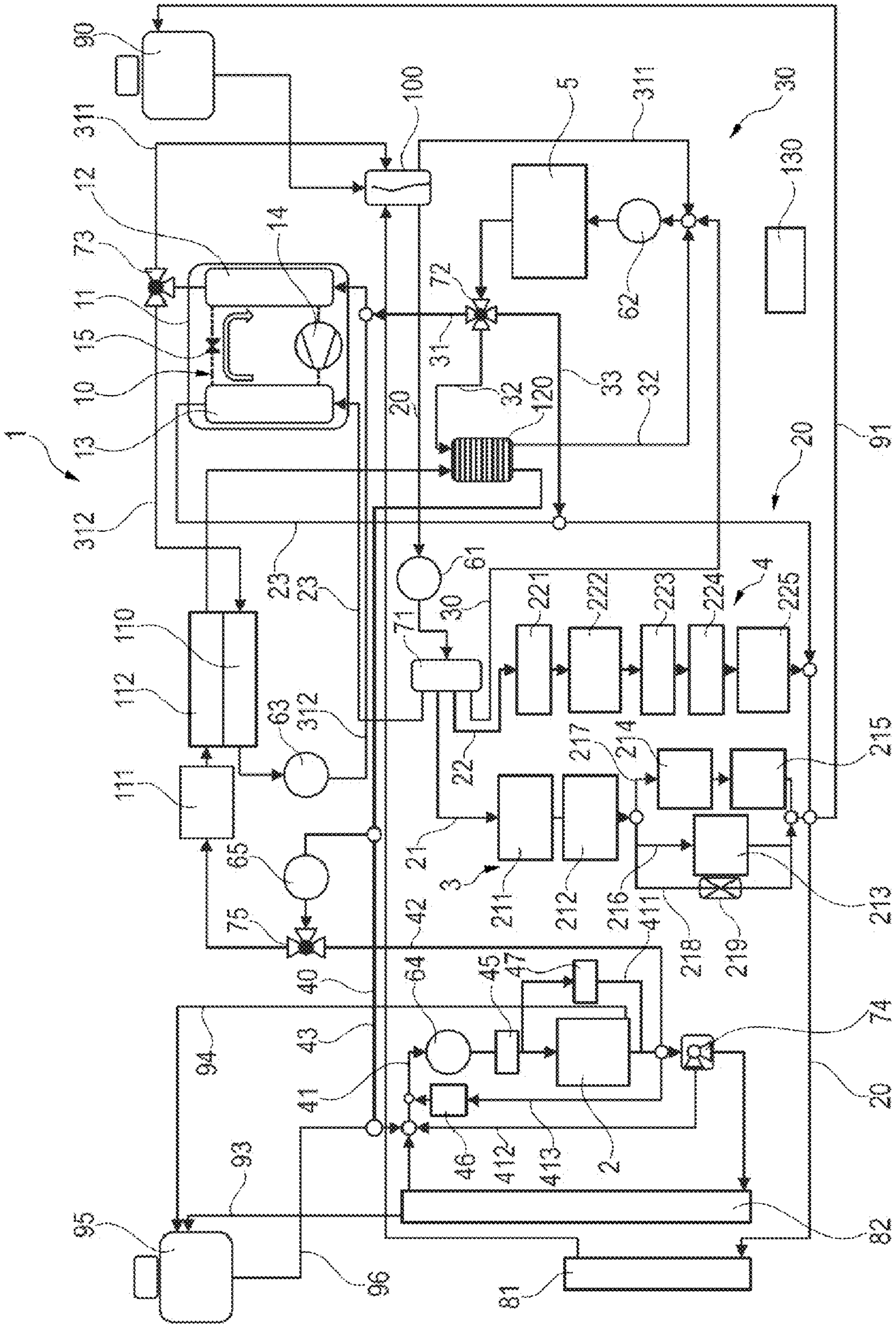
FIG. 1 shows a circuit diagram of an embodiment of a cooling system having a single chiller according to the disclosure.

FIG. 1 shows a circuit diagram of one embodiment of a cooling system 1 according to the disclosure. The cooling system 1 is arranged in a vehicle having fuel cells 2, i.e. in an electrically driven vehicle, which has fuel cells 2 for generating electrical energy. The cooling system 1 is provided for cooling the fuel cells 2, electronic component parts for controlling the fuel cells (PEFC: power electronics for fuel cells) 3, electronic component parts for controlling the electric drive (PEEM: power electronics for electric motor) 4, and a traction battery 5. In the text which follows, the traction battery 5 is also referred to synonymously as a battery.

The cooling system 1 has a first circuit 10, a second circuit 20, a third circuit 30, and a fourth circuit 40. The first circuit 10 runs in a cooler unit 11 and a refrigerant flows through it. The first circuit 10 can also be referred to as the primary circuit. The cooler unit 11 is also referred to as a "compact refrigerant system". Within the cooler unit 11, the first circuit runs through an indirect evaporator 12 (also referred to as a chiller) and an indirect condenser 13 (also referred to as an iCond). The chiller 12 is connected via a line to a compressor 14 and via a line containing a restrictor 15 to the indirect condenser 13.

In comparison with the primary or first circuit 10, the second circuit 20 and the third circuit 30 are also referred to as secondary circuits. The fourth circuit 40 for cooling the fuel cells is independent of the other circuits and is controlled separately. A coolant flows in the second, third and fourth circuits 20, 30, 40. A water-glycol mixture or some other expedient coolant familiar to a person skilled in the art is used as the coolant.

Figure 3:
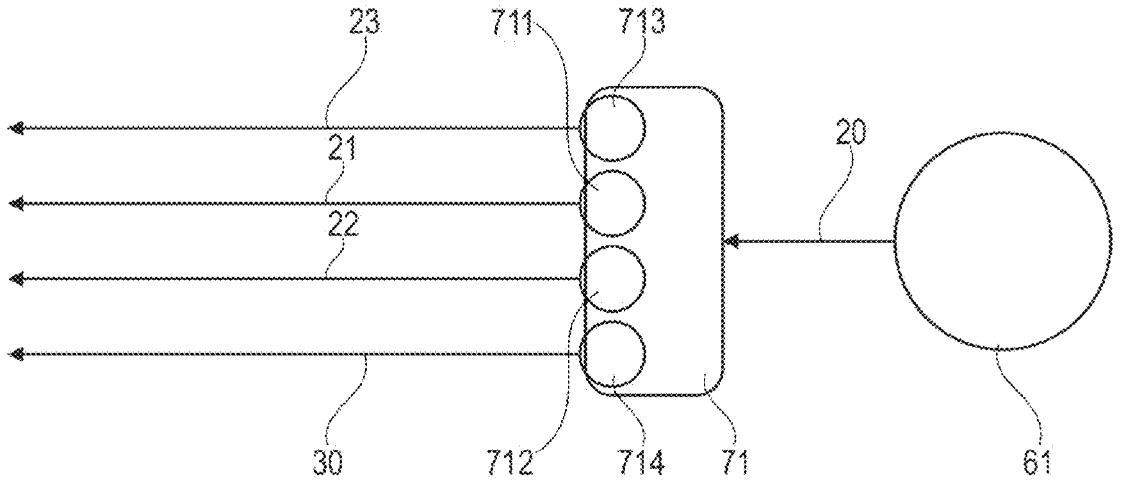
FIG. 3 shows one embodiment of a proportional control valve.

A first pump 61 is arranged to drive the coolant flow in the second circuit 20. A first control valve 71, which is a proportional valve, is arranged downstream of the first pump 61. The first control valve 71 has an inlet 715 and a first outlet 711, a second outlet 712, a third outlet 713 and a fourth outlet 714. FIG. 3 shows a detailed illustration of the first control valve 71.

The second coolant circuit 20 branches via the outlets of the first control valve 71 into three partial circuits, namely into a first partial circuit 21 at the first outlet 711, into a second partial circuit 22 at the second outlet 712, and into a third partial circuit 23 at the third outlet 713. The fourth outlet 714 is connected to a line which belongs to the third circuit 30 and is thus arranged for the flow of the coolant to the traction battery 5.

The first partial circuit 21 runs in the region of the PEFC 3. Arranged downstream of the first control valve 71 are a DC to DC converter for the fuel cell 211, a DC to DC converter for the battery 212, a current distributor unit for fuel cell 213, a compressor control device 214, and an electric compressor 215. Downstream of the DC to DC converter for the battery 212, the first partial coolant circuit 21 branches into three legs, and therefore the current distributor unit for fuel cell 213 is arranged in a first leg 216, and the compressor control device 214 and the electric compressor 215 are arranged in the second leg 217. Arranged in a third leg 218 is a restrictor device 219, which serves to limit the coolant flow rate. Downstream of said devices, the legs 216, 217, 218 come together again to form a line of the first partial circuit 21.

The second partial circuit 22 runs in the region of the PEEM 4. Arranged downstream of the first control valve 71 are a charger 221, a high-voltage/low-voltage DC to DC converter 222, an on-board generator frequency converter 223, a frequency converter 224 and an electric motor 225.

The third partial circuit 23 runs from the first control valve 71 to the indirect condenser 13. From there, the third partial circuit 23 runs to the second partial circuit 22, whose line it enters downstream of the PEEM 4.

Downstream of the PEFC 3, the lines of the first partial circuit 21 and of the second partial circuit 22 and thus also of the third partial circuit 23 come together again to form a line of the second circuit 20. A first expansion line 91, which leads to a first expansion tank 90, branches off from the region of the entry of the second partial circuit 22 into the first partial circuit 21. The first expansion tank 90 is a low-temperature expansion tank.

A first radiator 81 is arranged in the second circuit 20 downstream of the corresponding entry. The first radiator 81 is a low-temperature radiator. From the first radiator 81, the line of the second circuit leads to a collecting tank 100. A first expansion connecting line 92 from the first expansion tank 90 also leads to the collecting tank 100.

The third circuit serves to cool the battery 5. The third circuit 30 runs from the fourth outlet 714 of the first control valve 71 to a second pump 62, which drives the flow in the direction of the battery 5. From the battery 5, the third circuit 30 runs to a second control valve 72, which is designed as a directional control valve. Three line sections lead away from the second control valve 72.

A first line section 31 of the third circuit 30 leads to the chiller 12. Arranged in the third line section 31, downstream of the chiller 12, is a third control valve 73, which is designed as a directional control valve. A first line subsection 311 leads to the collecting tank 100, from where the first line subsection 311 leads to a node downstream of the second pump 62, where it comes together with the line of the third circuit 30 coming from the control valve 71. A second line subsection 312 leads from the third control valve 73 to a cooling device 110 for the vehicle interior. Downstream of the cooling device 110, the second line subsection 312 leads back to the chiller 12, wherein the second line subsection 312 comes together downstream of the chiller 12 with the first line section 31 coming from the second control valve 72. A third pump 63 is arranged in the second line subsection 312 downstream of the cooling device 110.

Figure 2:
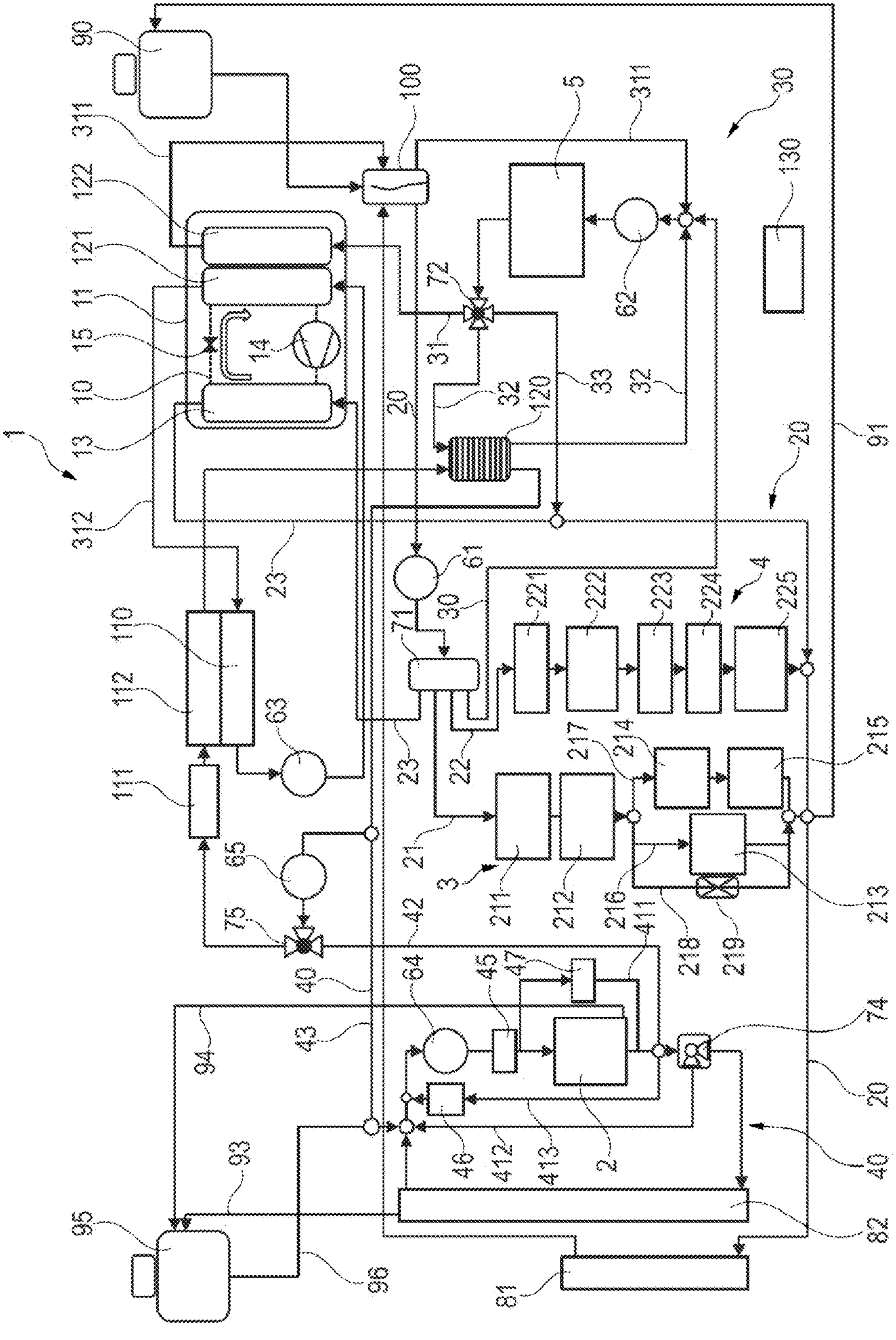
FIG. 2 shows a circuit diagram of an embodiment of a cooling system having two chillers according to the disclosure.

In another embodiment of the cooling system 1 according to the disclosure, which is shown in FIG. 2, the cooler unit 11 has two chillers 12, namely a first chiller 121 and a second chiller 122. In this case, the first chiller 121 is connected to the cooling device 110 and, together with the latter, forms a separate cabin cooling circuit 33, which is driven by a third pump 63. In this embodiment, the first line section 31 is not divided and runs from the second control valve 72 to the second chiller 122, from there to the collecting tank 100, and from there to the node downstream of the second pump 62, where it comes together with the line of the third circuit 30 coming from the first control valve 71.

A second line section 32 of the third circuit 30 leads to a heat exchanger 120 and from there to the second pump 62. Downstream of the second pump 62, the second line section 32 comes together with the first line subsection 311 and the line of the third circuit 30 coming from the first control valve 71.

A third line section 33 of the third circuit 30 leads to the third partial circuit 23 of the second circuit 20, which it enters downstream of the indirect condenser 13.

The fourth circuit 40 is a high-temperature circuit. In the fourth coolant circuit 40, the coolant flows through a first line section 41 to the fuel cells 2. In this case, the coolant is driven by a fourth pump 64. A particle filter 45 is arranged in the first line section 41 downstream of the fuel cells 2. A first bypass line 411 branches off downstream of the fuel cells 2 and leads to a watercooled charge air cooler 47. Compressed air that is passed to the fuel cell is thereby cooled. In this case, a small partial flow of coolant is guided past the fuel cell. Downstream of the watercooled charge air cooler, the first bypass line 411 enters the first partial circuit 41 downstream of the fuel cells.

Arranged in the first line section 41, downstream of the fuel cells 2, is a fourth control valve 74, which is designed as a three-way valve with a temperature sensor, in other words a temperature-dependent three-way valve. Depending on the temperature of the coolant, the coolant can be passed through a second radiator 82 or can be guided past the second radiator 82 by a second bypass line 412, wherein the second bypass line 412 re-enters the first line section 41 downstream of the second radiator 82. The fourth circuit 40 is connected to a second expansion tank 95 via a second expansion line 93, which starts from the second radiator 82, and a third expansion line 94, which starts from the fuel cells 2. The second expansion tank 95 is a high-temperature expansion tank. A second expansion connecting line 96 leads from the second expansion tank 95 back to the first line section 41. An ion exchanger device 46 is arranged in a further, third bypass line 413, which branches off from the first line section 41 upstream of the fourth control valve 74.

Branching off from the first line section 41, upstream of the fourth control valve 74, there is furthermore a second line section 42, which leads to a PTC heating element 111 of a heating device 112, arranged downstream thereof, for the vehicle interior and to the heat exchanger 120. Downstream of the heat exchanger 120, the fourth circuit 40 in the form of a third line section 43 runs to the second expansion connecting line 96.

Arranged in the second line section 42, is a fifth control valve 75, which is designed as a directional control valve. At the fifth control valve 75, one branch of the third line section 43 enters the second line section 42. A fifth pump 65 is arranged in the branch of the third line section 43

Figure 4:
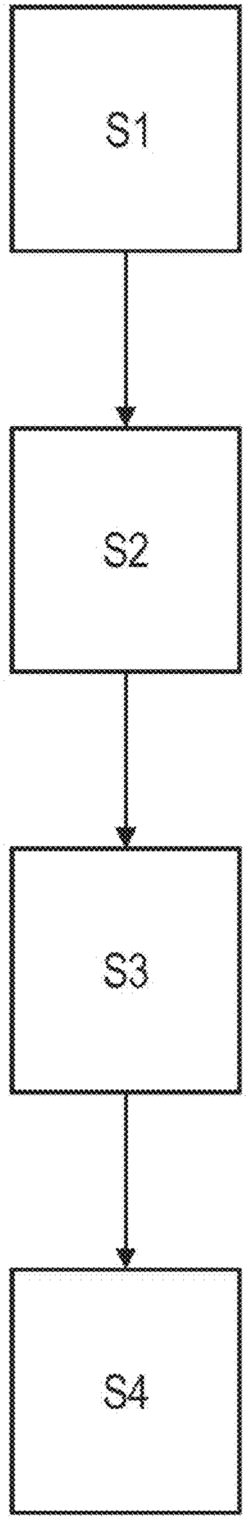
FIG. 4 shows a flow diagram of one embodiment of a method according to the disclosure.

In a method according to FIG. 4 for controlling the cooling system according to FIG. 1 or 2, the temperatures in the fuel cells 2, the electronic components 3 provided for control of the fuel cells, the electronic components of the electric drive system 4, and the battery 5 are measured in a first step S1. For the measurement of the temperatures, sensors (not shown) are provided, and these transmit the measured values to a control device 130.

In a second step S2, the cooling requirements of said devices of the vehicle are determined by the control device 130. In this case, the fuel cells 2 are cooled continuously in the (fourth) high-temperature circuit 40 and affect the method only indirectly.

In a third step S3, a control command is transmitted from the control device 130 to the first control valve 71. In a fourth step S4, the first control valve 71 is switched in such a way that a coolant flow to the devices in the first 21, second 22 and third partial circuits 23 of the second circuit 20 and in the third circuit 30 is controlled according to requirements, wherein the flow in the first 10 and fourth circuits 40 is controlled independently of the first controllable valve 71.

In a first switching mode of the first controllable valve 71, the inlet 715 and the first outlet 711 are opened, and the outlets 712, 713 and 714 of the first control valve are closed. The first switching mode is set when said devices do not require any cooling. As a result, no coolant flow is made available in the second 20 and third circuits 30. In the first switching mode, the first pump 61 is also switched off, as a result of which no coolant flows through the first partial circuit 21 either.

In a second switching mode of the first controllable valve 71, cooling of the PEFC 3 becomes necessary because the fuel cells 2 are active. Alternatively or in addition, the second switching mode can be set when a first threshold value of the temperature of the PEFC 3 has been reached. A corresponding threshold value is set, and its being reached is determined by means of temperature sensors, which are arranged on all the components and transmit measured values to the control device. Here, the second switching mode corresponds to the first switching mode, with the difference that the first pump 61 is switched on and coolant can flow through the first control valve 71 and through the first partial circuit 21. A coolant flow of 15 l/min is made available via the first partial circuit 21. The other outlets of the first control valve 71 are closed. A total of 15 l/min flows through the first control valve 71.

In a third switching mode of the first controllable valve 71, cooling of the PEFC 3 is furthermore necessary. Cooling of the coolant by the indirect condenser 13 is required. For this purpose, the first pump 61 is switched on, and a coolant flow of 15 l/min is made available via the first partial circuit 21. In addition, the third outlet 713 of the first control valve 71 is opened, and a coolant flow of 12 l/min is made available via the third partial circuit 23. The other outlets of the first control valve 71 are closed, such that a total of 27 l/min flows through the first control valve 71.

In a fourth switching mode of the first controllable valve 71, cooling of the PEFC 3 is furthermore necessary. Cooling of the coolant by the indirect condenser 13 is required. Cooling of the PEEM 4 is furthermore necessary. For this purpose, the first pump 61 is switched on, and a coolant flow of 15 l/min is made available via the first partial circuit 21. In addition, the third outlet 713 of the first control valve 71 is opened, and a coolant flow of 12 l/min is made available via the third partial circuit 23. In addition, the second outlet 712 of the first control valve 71 is opened, and a coolant flow of 12 l/min is made available via the second partial circuit 22. The fourth outlet 714 of the first control valve 71 is closed, such that a total of 39 l/min flows through the first control valve 71.

In a fifth switching mode of the first controllable valve 71, cooling of the PEFC 3 is furthermore necessary. Cooling of the coolant by the indirect condenser 13 is required. In addition, cooling of the PEEM 4 is necessary because a first threshold value of the temperature of the PEEM 4 has been reached. For this purpose, the first pump 61 is switched on, the inlet 715 and the first outlet 711 of the first control valve 71 are opened, and a coolant flow of 15 l/min is made available via the first partial circuit 21. In addition, the third outlet 713 of the first control valve 71 is opened, and a coolant flow of 6 l/min is made available via the third partial circuit 23. In addition, the second outlet 712 of the first control valve 71 is opened, and a coolant flow of 6 l/min is made available via the second partial circuit 22. In addition, the fourth outlet 714 of the first control valve 71 is opened because a first threshold value of the battery temperature has been reached and hence cooling of the battery becomes necessary, and a coolant flow of 12 l/min is made available via the third circuit 30, such that a total of 39 l/min flows through the first control valve 71.

In a sixth switching mode of the first controllable valve 71, cooling of the PEFC 3 becomes necessary because the fuel cells 2 are active. In addition, cooling of the battery 5 is necessary because the first threshold value of the battery temperature has been reached. For this purpose, the first pump 61 is switched on, and a coolant flow of 15 l/min is made available via the first partial circuit 21. In addition, the fourth outlet 714 of the first control valve 71 is opened because the first threshold value of the battery temperature has been reached and hence cooling of the battery becomes necessary, and a coolant flow of 12 l/min is made available via the third circuit 30, such that a total of 27 l/min flows through the first control valve 71.

The flow values mentioned are illustrative, and the first control valve 71 is not limited to these values. The illustrative values are intended to show that a maximum flow of 39 l/min is not exceeded in the various modes. If all the components simultaneously required a maximum possible flow, there would be a maximum flow of 51 l/min; however, this case never occurs. As a result, the overall cooling system can have smaller dimensions than if a maximum possible flow were assumed.

Figure 5:
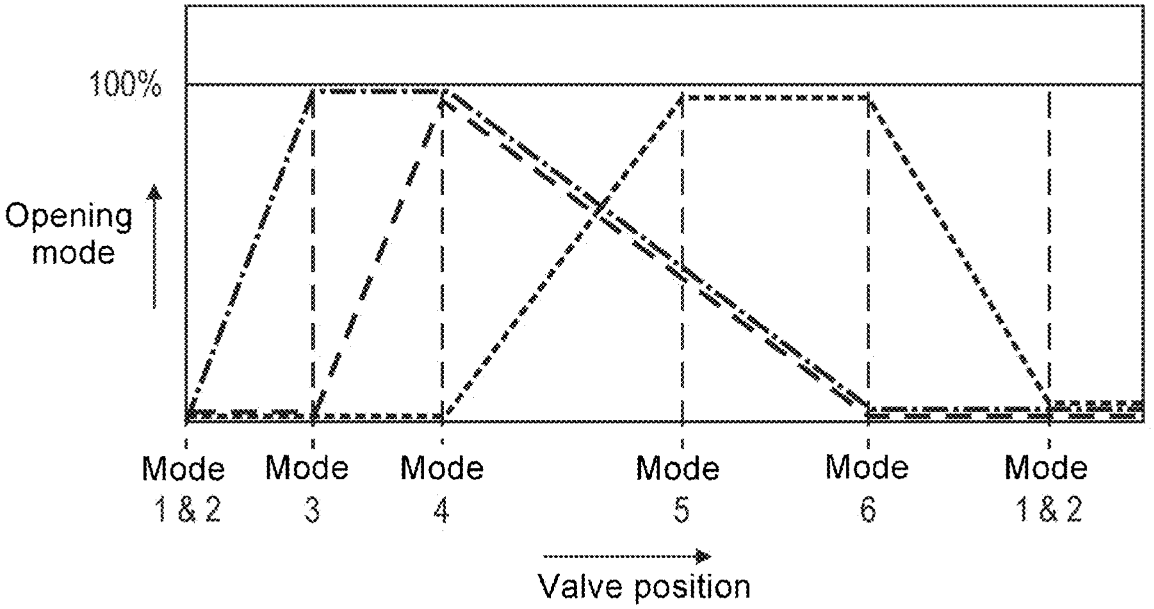
FIG. 5 shows a diagram illustrating the coolant flow in the cooling system depending on the switching mode of the proportional control valve.

The control of the coolant flow in the second and third circuits 20, 30 by means of the first control valve 71 is illustrated in a diagram in FIG. 5. Here, a distinction is drawn between six switching modes of the first control valve 71. In this case, the first outlet 711 is 100% open in all the switching modes (solid line). In mode 2, coolant flows through the first partial circuit 21 (PEFC 3) because the first pump 61 is switched on.

The third outlet 713 (dash-dotted line) is then opened, and coolant begins to flow through the third partial circuit 23 to the indirect condenser 13 until the third outlet 713 is 100% open in modes 3 and 4.

The second outlet 712 (dashed line) is then opened, and coolant begins to flow through the second partial circuit 22 (PEEM 4) until the second outlet 712 is 100% open in mode 4.

The fourth outlet 714 (dotted line) is then opened, and coolant begins to flow through the third circuit 30. At the same time, outlets 712 and 713 are partially closed. In the fifth mode, the fourth outlet 714 is 100% open, and the second outlet 712 and the third outlet 713 are 50% open.

The second and third outlets 712 and 713 are then closed, while the fourth outlet 714 is opened. In the sixth mode the first outlet 711 (as always) and the fourth outlet 714 are 100% open, and the second and third outlets 712, 713 are closed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell vehicle cooling system, comprising:

a first circuit having an indirect evaporator and an indirect condenser;

a low-temperature second circuit including a first partial circuit configured to cool fuel cell electronic control components, a second partial circuit configured to cool electric drive system electronic control components, and a third partial circuit including the indirect condenser;

a third circuit configured to cool a vehicle traction battery;

a high-temperature fourth circuit configured to cool vehicle fuel cells;

a plurality of liquid coolant pumps selectively controllable to pump liquid coolant through one or more of the first, second, third, and fourth circuits;

a plurality of controllable valves configured to control liquid coolant flow through the second circuit and the third circuit, wherein a first controllable valve of the plurality of controllable valves controls coolant flow between the second circuit and the third circuit, and wherein the first controllable valve is the only valve in the second circuit, and wherein the first controllable valve is configured such that no coolant flow is provided in the second circuit and the third circuit in a first switching mode of the first controllable valve.

2. The cooling system of claim 1 wherein a first pump of the plurality of liquid coolant pumps is arranged as the only pump in the second circuit.

3. The cooling system of claim 2 wherein the first controllable valve comprises a proportional control valve.

4. The cooling system of claim 3 wherein the first controllable valve has one inlet and four outlets.

5. The cooling system of claim 1 wherein the first controllable valve is configured such that coolant flows through the first partial circuit of the second circuit in a second switching mode of the first controllable valve.

6. The cooling system of claim 1 wherein the first controllable valve is configured such that coolant flows through the first partial circuit and the third partial circuit of the second circuit in a third switching mode of the first controllable valve.

7. The cooling system of claim 1 wherein the first controllable valve is configured such that coolant flows through the first, second, and third partial circuits of the second circuit in a fourth switching mode of the first controllable valve.

8. The cooling system of claim 1 wherein the first controllable valve is configured such that coolant flows through the first, second, and third partial circuits of the second circuit, and through the third circuit in a fifth switching mode of the first controllable valve.

9. The cooling system of claim 1 wherein the first controllable valve is configured such that coolant flows through the first partial circuit of the second circuit, and through the third circuit in a fourth switching mode of the first controllable valve.

10. The cooling system of claim 1 wherein the first circuit has only one indirect condenser and two indirect evaporators.

11. A motor vehicle comprising a cooling system according to claim 1.

12. A method for controlling the fuel cell system of claim 1, wherein a control device in communication with the plurality of liquid coolant pumps and the plurality of controllable valves is programmed to:

determine temperature of the fuel cell electronic control components, the electric drive system electronic control components, and the traction battery;

in response to the temperature of at least one of the fuel cell electronic control components, the electric drive system electronic control components, and the traction battery exceeding a corresponding threshold, controlling the first controllable valve such that coolant flows through an associated one of the first, second, and third partial circuits of the second circuit and through the third circuit to cool the at least one of the fuel cell electronic control components, the electric drive system electronic control components, and the traction battery to a temperature below the corresponding threshold.

13. A method for controlling a fuel cell vehicle cooling system including: a first circuit having an indirect evaporator and an indirect condenser; a low-temperature second circuit including a first partial circuit configured to cool fuel cell electronic control components, a second partial circuit configured to cool electric drive system electronic control components, and a third partial circuit including the indirect condenser; a third circuit configured to cool a vehicle traction battery; a high-temperature fourth circuit configured to cool vehicle fuel cells; a plurality of liquid coolant pumps selectively controllable to pump liquid coolant through one or more of the first, second, third, and fourth circuits; and a plurality of controllable valves configured to control liquid coolant flow through the second circuit and the third circuit, wherein a first controllable valve of the plurality of controllable valves controls coolant flow between the second circuit and the third circuit, and wherein the first controllable valve is the only valve in the second circuit and includes one inlet and four outlets, the method comprising, by a programmed controller:

controlling the first controllable valve so that no coolant flows through the second circuit and the third circuit in a first switching mode of the first controllable valve.

14. The method of claim 13 further comprising controlling the first controllable valve so that coolant flows through the first partial circuit of the second circuit in a second switching mode of the first controllable valve.

15. The method of claim 14 further comprising controlling the first controllable valve so that coolant flows through the first partial circuit and the third partial circuit of the second circuit in a third switching mode of the first controllable valve.

16. The method of claim 15 further comprising controlling the first controllable valve so that coolant flows through the first, second, and third partial circuits of the second circuit in a fourth switching mode of the first controllable valve.

17. The method of claim 16 wherein coolant flows through the first partial circuit of the second circuit, and through the third circuit in the fourth switching mode of the first controllable valve.

18. The method of claim 16 further comprising controlling the first controllable valve so that coolant flows through the first, second, and third partial circuits of the second circuit, and through the third circuit in a fifth switching mode of the first controllable valve.

19. The method of claim 13 wherein the first circuit has only one indirect condenser and two indirect evaporators.

* * * * *